US008749766B1

(12) United States Patent
Wilkins et al.

(10) Patent No.: US 8,749,766 B1
(45) Date of Patent: Jun. 10, 2014

(54) OPTICAL AIRFLOW SENSOR

(75) Inventors: Donald F. Wilkins, O'Fallon, MO (US);
Daniel N. Harres, Belleville, IL (US)

(73) Assignee: The Boeing Company, Chicago, IL (US)

(*) Notice: Subject to any disclaimer, the term of this patent is extended or adjusted under 35 U.S.C. 154(b) by 86 days.

(21) Appl. No.: 13/454,102

(22) Filed: Apr. 24, 2012

(51) Int. Cl.
*G01P 3/36* (2006.01)

(52) U.S. Cl.
USPC .............. 356/28; 73/861.24; 250/227.14

(58) Field of Classification Search
USPC .............. 356/335–343, 27–28.5; 73/861.24, 73/861.22; 250/227.14, 231.1, 231.19
See application file for complete search history.

(56) References Cited

U.S. PATENT DOCUMENTS

| 3,867,033 | A | * | 2/1975 | Hasinger ................. 356/342 |
| 4,307,618 | A | | 12/1981 | James et al. |
| 4,358,678 | A | * | 11/1982 | Lawrence ................. 250/227.14 |
| 4,372,165 | A | * | 2/1983 | Pitt et al. ................. 73/861.22 |
| 4,639,593 | A | | 1/1987 | Stetson et al. |
| 4,706,502 | A | * | 11/1987 | Jones et al. ................ 73/861.24 |
| 4,891,990 | A | * | 1/1990 | Khalifa et al. ............ 73/861.24 |
| 4,976,157 | A | * | 12/1990 | Berthold et al. .......... 73/861.24 |
| 5,120,951 | A | | 6/1992 | Small |
| 8,234,931 | B2 | * | 8/2012 | Cheng et al. ............... 73/861.24 |
| 2007/0064218 | A1 | * | 3/2007 | Montgomery et al. ......... 356/28 |
| 2010/0142880 | A1 | * | 6/2010 | Rodriguez Erdmenger et al. .............................. 385/12 |
| 2012/0323502 | A1 | * | 12/2012 | Tanoura et al. ................. 702/47 |

FOREIGN PATENT DOCUMENTS

GB 2238380 * 5/1991

* cited by examiner

*Primary Examiner* — Hoa Pham
(74) *Attorney, Agent, or Firm* — Ameh IP; Lowell Campbell; Elahe Tocsi

(57) ABSTRACT

An optical fluid flow sensor and methods are presented. An optical fiber bends in response to a fluid flow, and a light source coupled to the optical fiber transmits light to the optical fiber. Optical sensors surrounding a portion of the optical fiber receive a received light from the optical fiber, and a signal processor module estimates a fluid flow velocity of the fluid flow based on the received light.

20 Claims, 3 Drawing Sheets

OPTICAL AIRFLOW SENSOR

FIELD

Embodiments of the present disclosure relate generally to sensors. More particularly, embodiments of the present disclosure relate to fluid flow sensors.

BACKGROUND

A fluid flow sensor is generally a device for sensing a rate of fluid flow. There are various kinds of fluid flow sensors, including some that have a rotor pushed by a fluid driving a rotary potentiometer, or similar devices. Other flow sensors are based on sensors which measure a heat transfer caused by a moving medium, which is common for fluid micro-sensors. Velocimeters measure a velocity of fluids flowing through them. Hall effect sensors may also be used, for example, on a flapper valve to sense a position of the valve as displaced by a fluid flow.

Air flow around an aircraft is generally measured via a pitot tube. A pitot tube is a pressure measurement instrument used to measure fluid flow velocity. The pitot tube is generally used to measure a local velocity at a given point in a flow stream and not an average velocity in a pipe or conduit. A basic pitot tube may consist of a tube pointing directly into the fluid flow that is open at one end and closed at another end. When the tube contains a fluid from the flow stream, a pressure can be measured; where a moving fluid is brought to rest (stagnates) as there is no outlet to allow flow to continue. The pressure is a stagnation pressure of the fluid, also known as a total pressure or (particularly in aviation) a pitot pressure. Pitot tubes can become clogged, frozen or otherwise blocked so that air cannot flow to appropriate instruments.

SUMMARY

An optical fluid flow sensor and methods are disclosed. An optical fiber bends in response to a fluid flow, and a light source coupled to the optical fiber transmits light to the optical fiber. Optical sensors surrounding a portion of the optical fiber receive a received light from the optical fiber, and a processor module estimates a fluid flow velocity of the fluid flow comprising a speed (magnitude) and a direction of the fluid flow based on the received light.

In this manner, a low cost measurement system using optical fibers is provided that can allow multiple sensors to be incorporated into a structure such as a wing structure. The system also provides a much more detailed picture of an air flow over a surface and should allow greater maneuverability. The system can be simple, reliable, low cost and low weight, which may be useful for, for example, a subsonic Unmanned Arial Vehicle (UAV), or other vehicle/structure exposed to a fluid flow.

In an embodiment, an optical fluid flow sensor comprises an optical fiber, a light source, optical sensors, and a signal processor module. The optical fiber bends in response to a fluid flow. The light source is coupled to the optical fiber and transmits light to the optical fiber. The optical sensors surround a portion of the optical fiber and receive a received light from the optical fiber. The signal processor module estimates a fluid flow velocity of the fluid flow based on the received light.

In another embodiment, a method for sensing fluid flow transmits light from a light source into an optical fiber that bends in response to a fluid flow, and receives the fluid flow at the optical fiber. The method further receives a received light from the optical fiber at a plurality of optical sensors surrounding a portion of the optical fiber, and estimates a speed of the fluid flow based on the received light.

In a further embodiment, a method for providing an optical fluid flow sensor secures a first end of an optical fiber to a surface, the optical fiber bends in response to a fluid flow. The method further surrounds a portion of the optical fiber with a plurality of light sensors that receives a received light from the optical fiber. The method further couples the optical fiber to a light source that transmits light to the optical fiber, and provides a signal processor module that estimates a fluid flow velocity of the fluid flow based on the received light.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to signal processing, optical fibers, light sensors, electronic circuits, electronic devices, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a non-limiting application, namely, an airflow sensor. Embodiments of the disclosure, however, are not limited to such airflow sensor applications, and the techniques described herein may also be utilized in other applications. For example but without limitation, embodiments may be applicable to water flow sensors, slurry flow sensors, fluidized particle (e.g. sand) flow sensors, or other translucent or partially translucent fluid flow sensors.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
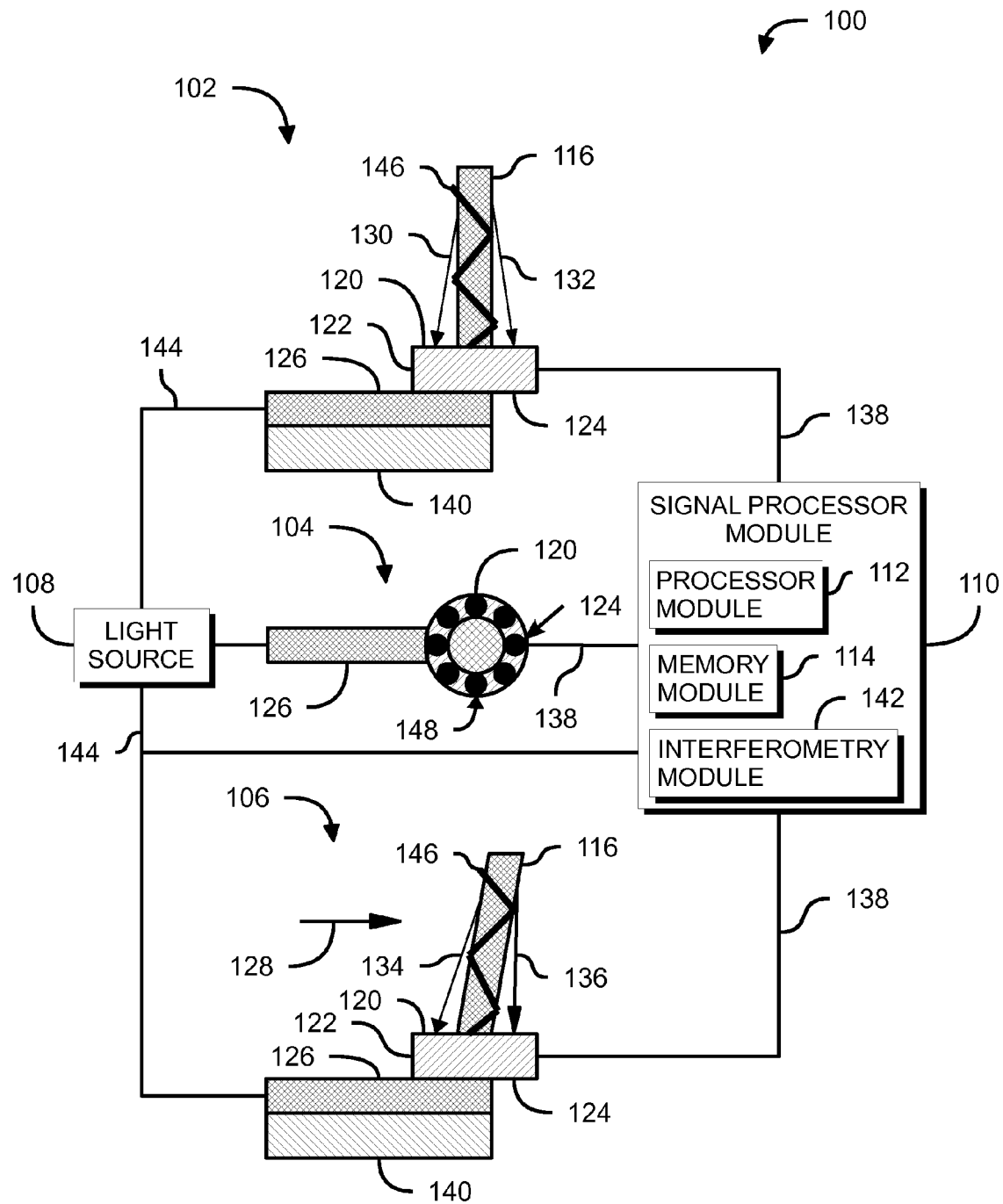
FIG. 1 is an illustration of an exemplary block diagram of an optical fluid flow sensor system according to an embodiment of the disclosure.

FIG. 1 is an illustration of an exemplary block diagram of an optical fluid flow sensor system 100 (system 100) according to an embodiment of the disclosure. System 100 may comprise an optical fiber 126, a light source 108, a plurality of optical sensors 120, and a signal processor module 110. The light source 108 is coupled to the optical fiber 126 and is configured to transmit light to the optical fiber 126. The optical sensors 120 surround an optical fiber portion 116 (portion 116) of the optical fiber 126 and are configured to receive a received light 130/132/134/136 from the optical fiber 126. The optical fiber portion 116 may be secured to a surface 140 such as, but without limitation, a surface of a fuselage, a wing of an aircraft, an aircraft, or other surface. The optical fiber portion 116 of the optical fiber 126 is located in a fluid stream such as a fluid flow 128.

The optical fiber portion 116 of the optical fiber 126 is configured to bend in response to the fluid flow 128. The fluid flow 128 may comprise, for example but without limitation, an airflow, a water flow, a slurry flow, a fluidized particle (e.g., sand) flow, or other fluid flow. The optical fiber 126 is further configured to bend in proportion to the fluid flow 128. When the optical fiber 126 bends in response to the fluid flow 128, the optical sensors 120 receive the received light 130/132/134/136. When the fluid flow 128 comprises a light flow (e.g., as shown in a side view 102) inducing a substantially no or a minimal deflection (e.g., as shown from a top view 104) of the optical fiber portion 116, a windward side sensor 122 receiving a windward side received light 130 and a leeward side sensor 124 receiving a leeward side received light 132 received from the optical fiber portion 116 of the optical fiber 126 will have a same intensity. When the fluid flow 128 comprises a significant flow (e.g., as shown in a side view 106) inducing a measurable deflection of the optical fiber portion 116, the windward side sensor 122 receiving a windward side received light 134 receives a lesser intensity, and a leeward side received light 136 receives a greater intensity of a received light from the optical fiber portion 116.

A bend control device 146 may be coupled to the optical fiber 126. The bend control device 146 may comprise, for example but without limitation, a spring, or other device operable to control bending of the optical fiber 126.

The optical fiber 126 may comprise, for example but without limitation, a glass, a plastic, or other optical fiber. The optical fiber 126 may comprise, for example but without limitation, a flexible transparent fiber that functions as a waveguide or "light pipe" to transmit light between two ends of the optical fiber 126. The optical fiber 126 may comprise, for example but without limitation, a transparent core surrounded by a transparent cladding material with a lower index of refraction, or other optical fiber configuration. Light is kept in the transparent core by total internal reflection, which causes the optical fiber 126 to act as a waveguide. Optical fibers that support many propagation paths or transverse modes are called multi-mode fibers (MMF), while optical fibers that only support a single mode are called single-mode fibers (SMF).

The signal processor module 110 is configured to estimate a fluid flow velocity comprising a speed and a direction of the fluid flow 128 based on the received light 130/132/134/136. For example but without limitation, the speed of the fluid flow 128 may be proportional to a measurable deflection of the optical fiber portion 116 toward the leeward side sensor 124 measured based on the intensity of the leeward side received light 136 from the optical fiber portion 116. The signal processor module 110 may receive a measured received light 130/132/134/136 in the system 100 via a sensor bus 138.

The signal processor module 110 is further configured to determine a direction of the fluid flow 128 based on the received light 130/132/134/136 at each of the optical sensors 120. For example but without limitation, the direction of the fluid flow 128 may be based on a direction of a sensor of the optical sensors 120 with a maximum measurable deflection (e.g., based on a maximum received light) of the optical fiber portion 116 toward the sensor based on the received light 130/132/134/136. For another example but without limitation, the direction of the fluid flow 128 may be triangulated based on the measurable deflection of the optical fiber portion 116 toward the leeward side sensor 124 and a deflection toward another sensor such as the lateral sensor 148 measured by a received light from the optical fiber portion 116 at the leeward side sensor 124 and the lateral sensor 148.

The signal processor module 110 may comprise, for example but without limitation, a processor module 112, a memory module 114, an interferometry module 142, or other module. The processor module 112 comprises processing logic that is configured to carry out the functions, techniques, and processing tasks associated with the operation of the system 100. In particular, the processing logic is configured to support the system 100 described herein. For example, the processor module 112 may estimate a fluid flow velocity of the fluid flow 128.

The processor module 112 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices comprising hardware and/or software, e.g., a combination of a digital signal processor and a microprocessor, a plurality of microprocessors, one or more microprocessors in conjunction with a digital signal processor core, or any other such configuration.

The memory module 114 may comprise a data storage area with memory formatted to support the operation of the system 100. The memory module 114 is configured to store, maintain, and provide data as needed to support the functionality of the system 100. For example but without limitation, the memory module 114 may store flight configuration data, intensity of the received light 130/132/134/136, sampling rate of the received light 130/132/134/136, magnitude of the fluid flow 128, or other data.

In some embodiments, the memory module 114 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 114 may be coupled to the processor module 112 and configured to store, for example but without limitation, a database, a computer program that is executed by the processor module 112, an operating system, an application program, tentative data used in executing a program, or other application. Additionally, the memory module 114 may represent a dynamically updating database containing a table for updating the database, and the like.

The memory module 114 may be coupled to the processor module 112 such that the processor module 112 can read information from and write information to the memory module 114. For example, the processor module 112 may access the memory module 114 to access the intensity of the received light 130/132/134/136, the sampling rate of the received light 130/132/134/136, the magnitude of the fluid flow 128, or other data.

As an example, the processor module 112 and memory module 114 may reside in respective application specific integrated circuits (ASICs) or other programmable devices. The memory module 114 may also be integrated into the processor module 112. In an embodiment, the memory module 114 may comprise a cache memory for storing temporary variables or other intermediate information during execution of instructions to be executed by the processor module 112.

The interferometry module 142 is operable to combine the received light 132/136/134/136 with a source light 144 (light 144) to produce an interferometric pattern. The interferometric pattern may be used to, for example but without limitation, measure a fluid velocity, produce a visual representation of stresses on the optical fiber 126, or other interferometry application.

Figure 2:
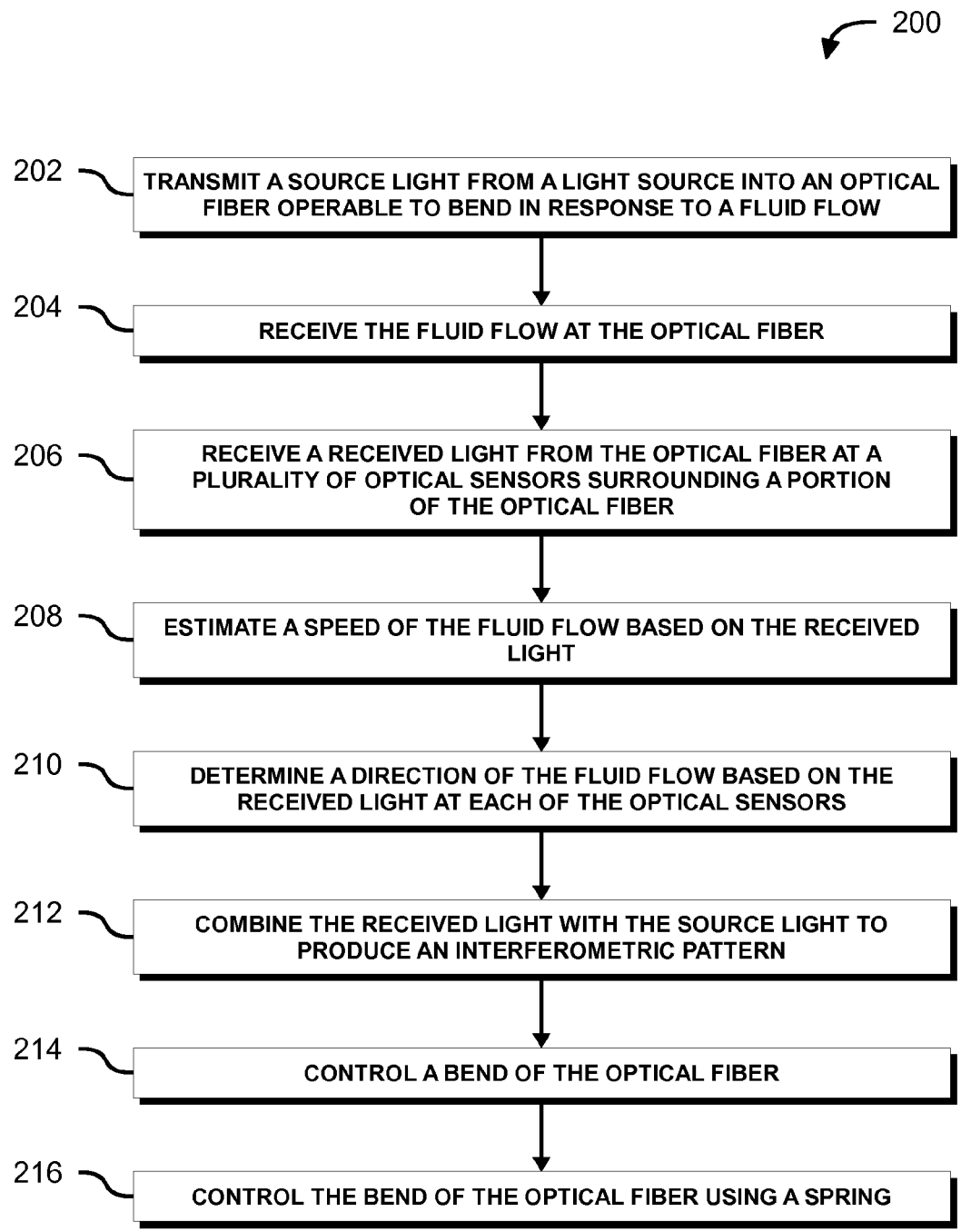
FIG. 2 is an illustration of an exemplary flowchart showing a process for sensing fluid flow according to an embodiment of the disclosure.

FIG. 2 is an illustration of an exemplary flowchart showing a process 200 for sensing fluid flow according to an embodiment of the disclosure. The various tasks performed in connection with process 200 may be performed mechanically, by software, hardware, firmware, computer-readable software, computer readable storage medium, or any combination thereof. It should be appreciated that process 200 may include any number of additional or alternative tasks, the tasks shown in FIG. 2 need not be performed in the illustrated order, and the process 200 may be incorporated into a more comprehensive procedure or process having additional functionality not described in detail herein.

For illustrative purposes, the following description of process 200 may refer to elements mentioned above in connection with FIG. 1. In some embodiments, portions of the process 200 may be performed by different elements of the system 100 such as: the optical fiber 126, the fluid flow 128, the light source 108, the optical sensors 120, the signal processor module 110, etc. It should be appreciated that process 200 may include any number of additional or alternative tasks, the tasks shown in FIG. 2 need not be performed in the illustrated order, and the process 200 may be incorporated into a more comprehensive procedure or process having additional functionality not described in detail herein.

Process 200 may begin by transmitting a source light such as the source light 144 from a light source such as the light source 108 into an optical fiber such as the optical fiber 126 operable to bend in response to a fluid flow such as the fluid flow 128 (task 202). As mentioned above, the fluid flow 128 may comprise, for example but without limitation, an airflow, a water flow, a slurry flow, a fluidized particle (e.g., sand) flow, or other fluid flow.

Process 200 may continue by receiving the fluid flow 128 at the optical fiber 126 (task 204).

Process 200 may continue by receiving a received light such as the received light 130/132/134/136 from the optical fiber 126 at a plurality of optical sensors such as optical sensors 120 surrounding a portion of the optical fiber 126 such as the portion 116 (task 206).

Process 200 may continue by a signal processor module such as the signal processor module 110 estimating a speed of the fluid flow 128 based on the received light 130/132/134/136 (task 208). The speed may comprise, for example but without limitation, a substantially maximum fluid flow speed, an average fluid flow speed, or other fluid flow speed. For example but without limitation, as discussed above, the speed of the fluid flow 128 may be proportional to the measurable deflection of the optical fiber portion 116 toward the leeward side sensor 124 measured by the greater intensity of the leeward side received light 136 from the optical fiber portion 116.

Process 200 may continue by the signal processor module 110 determining a direction of the fluid flow 128 based on the received light 130/132/134/136 at each of the optical sensors 120 (task 210). For example but without limitation, as discussed above, the direction of the fluid flow 128 may be based on a direction of a sensor of the optical sensors 120 with a maximum measurable deflection of the optical fiber portion 116 toward the sensor. For another example but without limitation, as discussed above, the direction of the fluid flow 128 may be triangulated based on the measurable deflection of the optical fiber portion 116 toward the leeward side sensor 124 and a deflection toward another sensor such as the lateral sensor 148 measured by a received light from the optical fiber portion 116 at the leeward side sensor 124 and the lateral sensor 148.

Process 200 may continue by an interferometry module such as the interferometry module 142 combining the received light 130/132/134/136 with the source light 144 to produce an interferometric pattern (task 212). As discussed above, the interferometric pattern may be used to, for example but without limitation, measure a fluid velocity, produce a visual representation of stresses on the optical fiber 126, or other interferometry application.

Process 200 may continue by a bend control device such as the bend control device 146 controlling a bend of the optical fiber 126 (task 214).

Process 200 may continue by the bend control device 146 controlling the bend of the optical fiber 126 using a spring (task 216).

Figure 3:
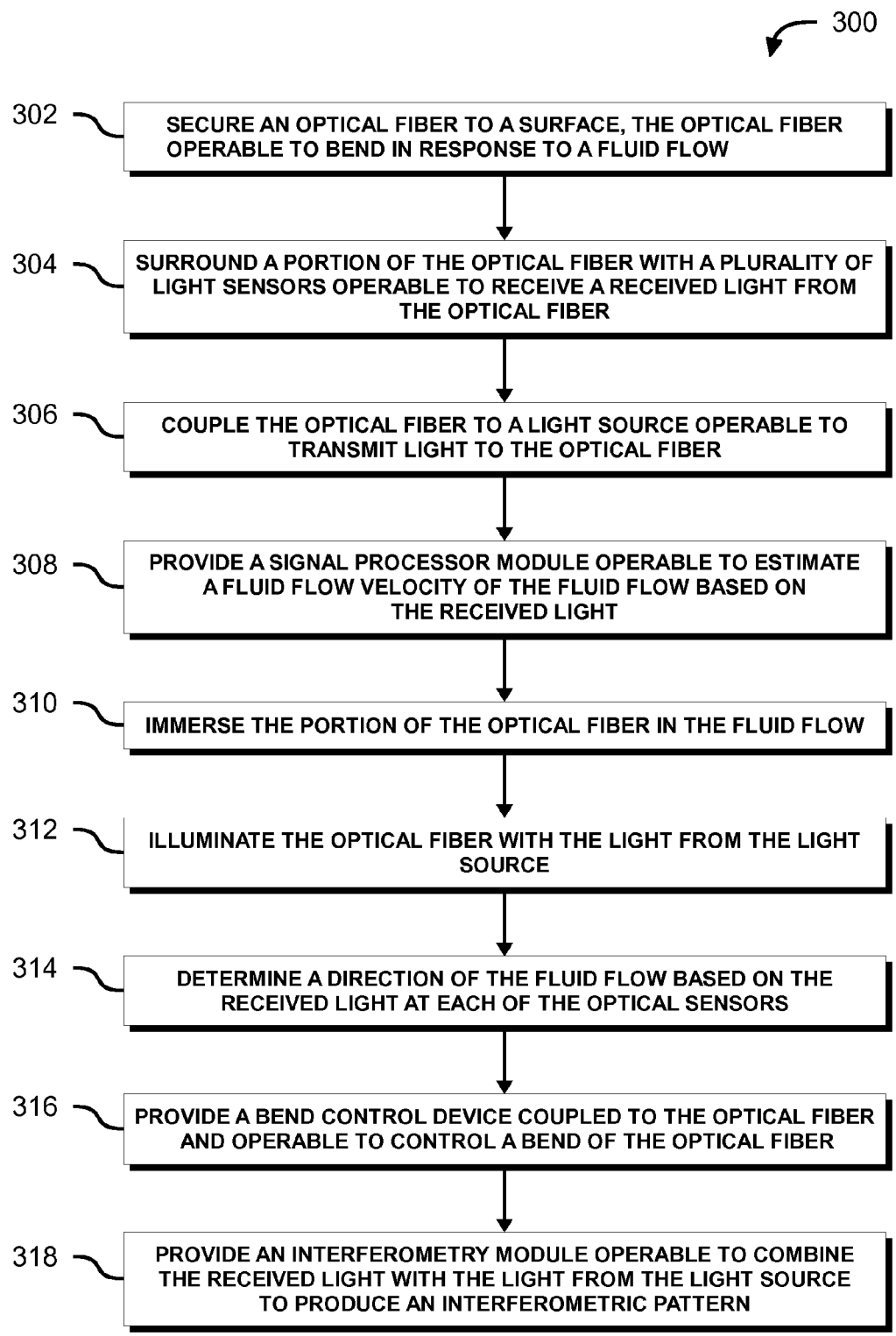
FIG. 3 is an illustration of an exemplary flowchart showing a process for providing an optical fluid flow sensor according to an embodiment of the disclosure.

FIG. 3 is an illustration of an exemplary flowchart showing a process 300 for providing an optical fluid flow sensor according to an embodiment of the disclosure. The various tasks performed in connection with process 300 may be performed mechanically, by software, hardware, firmware, computer-readable software, computer readable storage medium, or any combination thereof. It should be appreciated that process 300 may include any number of additional or alternative tasks, the tasks shown in FIG. 3 need not be performed in the illustrated order, and the process 300 may be incorporated into a more comprehensive procedure or process having additional functionality not described in detail herein.

For illustrative purposes, the following description of process 300 may refer to elements mentioned above in connection with FIG. 1. In some embodiments, portions of the process 300 may be performed by different elements of the system 100 such as: the optical fiber 126, the fluid flow 128, the light source 108, the optical sensors 120, the signal processor module 110, etc. It should be appreciated that process 300 may include any number of additional or alternative tasks, the tasks shown in FIG. 3 need not be performed in the illustrated order, and the process 300 may be incorporated into a more comprehensive procedure or process having additional functionality not described in detail herein.

Process 300 may begin by securing an optical fiber such as the optical fiber 126 to a surface such as the surface 140, the optical fiber 126 operable to bend in response to a fluid flow such as the fluid flow 128 (task 302). As mentioned above, the optical fiber 126 may be further configured to bend in proportion to the fluid flow 128. The surface 140 may comprise, for example but without limitation, a surface of a fuselage, a wing of an aircraft, an aircraft, or other surface.

Process 300 may continue by surrounding a portion of the optical fiber 126 such as the portion 116 with a plurality of light sensors such as the optical sensors 120 operable to receive a received light such as the received light 130/132/134/136 from the optical fiber 126 (task 304).

Process 300 may continue by coupling the optical fiber 126 to a light source such as the light source 108 operable to transmit light such as the light 144 to the optical fiber 126 (task 306).

Process 300 may continue by providing a signal processor module such as the signal processor module 110 operable to estimate a fluid flow velocity of the fluid flow 128 based on the received light 130/132/134/136 (task 308). As discussed above, the fluid flow velocity comprises a speed of the fluid flow 128 and a direction of the fluid flow 128.

Process 300 may continue by immersing a portion such as the portion 116 of the optical fiber 126 in the fluid flow 128 (task 310). As mentioned above, the fluid flow 128 may comprise, for example but without limitation, an airflow, a water flow, a slurry flow, a fluidized particle (e.g., sand) flow, or other fluid flow.

Process 300 may continue by illuminating the optical fiber 126 with the light 144 from the light source 108 (task 312).

Process 300 may continue by the signal processor module 110 determining a direction of the fluid flow 128 based on the received light 130/132/134/136 at each of the optical sensors 120 (task 314).

Process 300 may continue by providing a bend control device such as the bend control device 146 coupled to the optical fiber 126 and operable to control a bend of the optical fiber 126 (task 316). As mentioned above, the bend control device 146 may comprise, for example but without limitation, a spring, or other device operable to control bending of the optical fiber 126.

Process 300 may continue by providing an interferometry module operable to combine the received light 130/132/134/136 with the light 144 from the light source 108 to produce an interferometric pattern (task 318).

In this manner, a low cost measurement system using optical fibers that can allow multiple sensors to be incorporated into, for example, a wing structure is provided. The system also provides a much more detailed picture of the air flow over a surface and should allow greater maneuverability. The system is simple, reliable, low cost, and low weight, which may be useful for a subsonic UAV, or other structure exposed to a fluid flow.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIG. 1 depicts example arrangements of elements, additional intervening elements, devices, features, or components may be present in an embodiment of the disclosure.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 112 to cause the processor module 112 to perform specified operations. Such instructions, generally referred to as "computer program code" or "program code" (which may be grouped in the form of computer programs or other groupings), when executed, enable the system 100.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. An optical fluid flow sensor comprising:
   an optical fiber configured to be located in a fluid flow and operable to bend in response to the fluid flow;
   a light source coupled to the optical fiber and operable to transmit a received light into the optical fiber;

a plurality of optical sensors surrounding a portion of the optical fiber and operable to receive the received light from a side of the optical fiber; and a signal processor module operable to estimate a fluid flow velocity of the fluid flow based on the received light.

2. The optical fluid flow sensor of claim 1, wherein the optical fiber is further operable to bend in proportion to the fluid flow.

3. The optical fluid flow sensor of claim 1, wherein the signal processor module is further operable to determine a direction of the fluid flow based on the received light at each of the optical sensors.

4. The optical fluid flow sensor of claim 1, further comprising a bend controlling device coupled to the optical fiber.

5. The optical fluid flow sensor of claim 4, wherein the bend controlling device comprises a spring.

6. The optical fluid flow sensor of claim 1, wherein the fluid flow comprises an airflow.

7. The optical fluid flow sensor of claim 1, further comprising an interferometry module operable to combine the received light with the light from the light source to produce an interferometric pattern.

8. A method for sensing fluid flow, the method comprising:
transmitting a source light from a light source into an optical fiber operable to bend in response to a fluid flow;
receiving the fluid flow at the optical fiber;
receiving a received light from a side of the optical fiber at a plurality of optical sensors surrounding a portion of the optical fiber; and
estimating a speed of the fluid flow based on the received light.

9. The method of claim 8, wherein the optical fiber is further operable to bend in proportion to the fluid flow.

10. The method of claim 8, further comprising determining a direction of the fluid flow based on the received light at each of the optical sensors.

11. The method of claim 8, further comprising combining the received light with the source light to produce an interferometric pattern.

12. The method of claim 8, further comprising controlling a bend of the optical fiber.

13. The method of claim 8, further comprising controlling the bend of the optical fiber using a spring.

14. The method of claim 8, wherein the fluid flow comprises an airflow.

15. A method for providing an optical fluid flow sensor, the method comprising:
securing an optical fiber to a surface located in a fluid flow, the optical fiber operable to bend in response to the fluid flow;
surrounding a portion of the optical fiber with a plurality of light sensors operable to receive a received light from a side of the optical fiber;
coupling the optical fiber to a light source operable to transmit light into the optical fiber; and
providing a signal processor module operable to estimate a fluid flow velocity of the fluid flow based on the received light.

16. The method of claim 15, wherein the fluid flow comprises an airflow and the surface comprises an aircraft.

17. The method of claim 15, wherein the signal processor module is further operable to determine a direction of the fluid flow based on the received light at each of the optical sensors.

18. The method of claim 15, further comprising providing an interferometry module operable to combine the received light with the light from the light source to produce an interferometric pattern.

19. The method of claim 15, wherein the optical fiber is further operable to bend in proportion to the fluid flow.

20. The method of claim 15, further comprising providing a bend control device coupled to the optical fiber and operable to control a bend of the optical fiber.

* * * * *